April 13, 1943.    C. H. NESBIT    2,316,355
CLAMPING APPARATUS FOR OPTICAL FRAMES
Filed Sept. 24, 1941    5 Sheets-Sheet 1

Inventor
CHARLES H. NESBIT,
By Clarence A. O'Brien
Attorney

April 13, 1943.  C. H. NESBIT  2,316,355
CLAMPING APPARATUS FOR OPTICAL FRAMES
Filed Sept. 24, 1941  5 Sheets-Sheet 3

Inventor
CHARLES H. NESBIT,

By Clarence A. O'Brien

Attorney

April 13, 1943.   C. H. NESBIT   2,316,355
CLAMPING APPARATUS FOR OPTICAL FRAMES
Filed Sept. 24, 1941   5 Sheets-Sheet 4

Inventor
CHARLES H. NESBIT,

By *Clarence A. O'Brien*

Attorney

April 13, 1943. C. H. NESBIT 2,316,355
CLAMPING APPARATUS FOR OPTICAL FRAMES
Filed Sept. 24, 1941 5 Sheets-Sheet 5

Inventor
CHARLES H. NESBIT,

By Clarence A. O'Brien
Attorney

Patented Apr. 13, 1943

2,316,355

UNITED STATES PATENT OFFICE 2,316,355

CLAMPING APPARATUS FOR OPTICAL FRAMES

Charles H. Nesbit, Harvey, N. Dak.

Application September 24, 1941, Serial No. 412,169

3 Claims. (Cl. 113—104)

This invention relates to a clamping apparatus for optical frames and the like, the general object of the invention being to provide means for holding different parts of the frame while they are being welded together or otherwise operated upon, with means whereby the parts can be adjustable to different positions to suit different kinds of frames and different sizes of parts of the frames.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
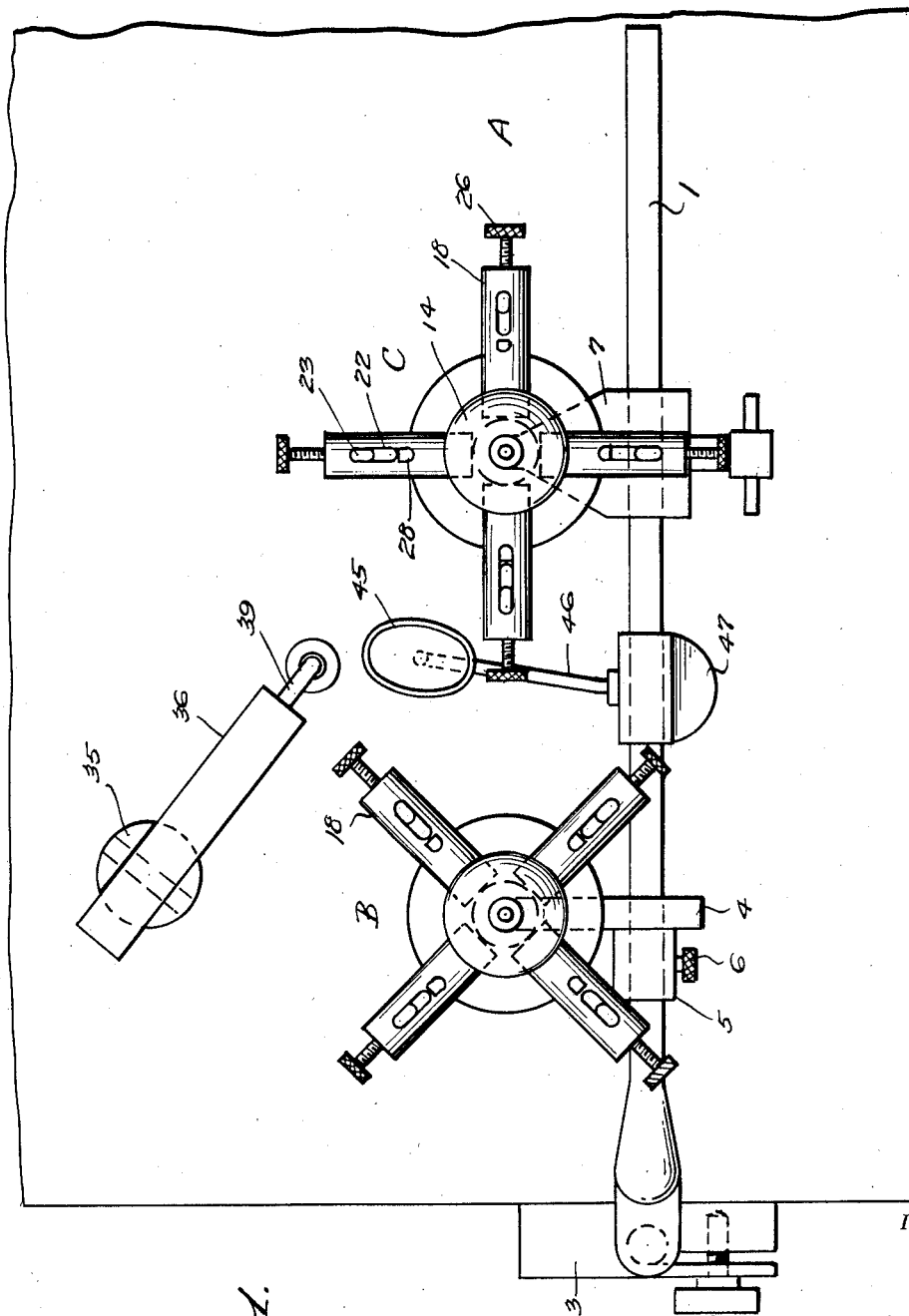
Figure 1 is a top plan view showing the complete apparatus on a work bench or table.
Figure 2:
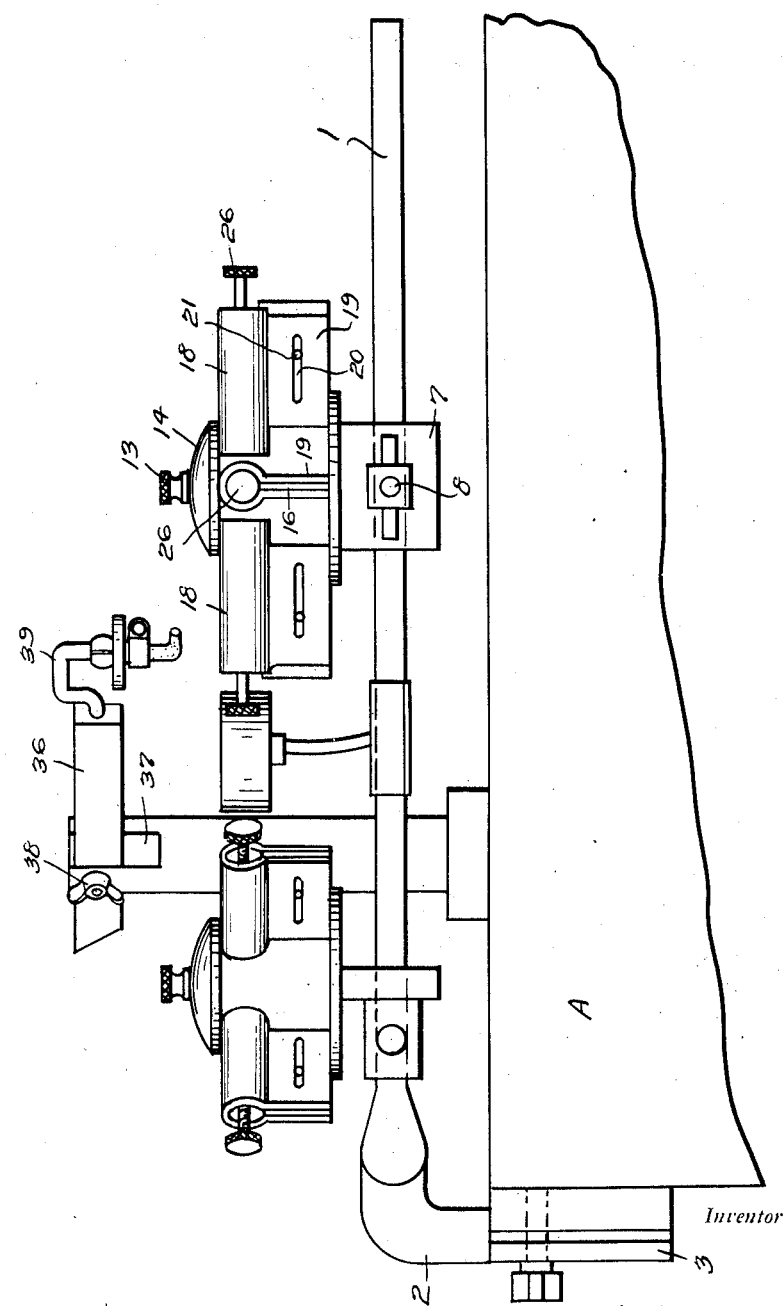
Figure 2 is an elevational view of Figure 1.
Figure 3:
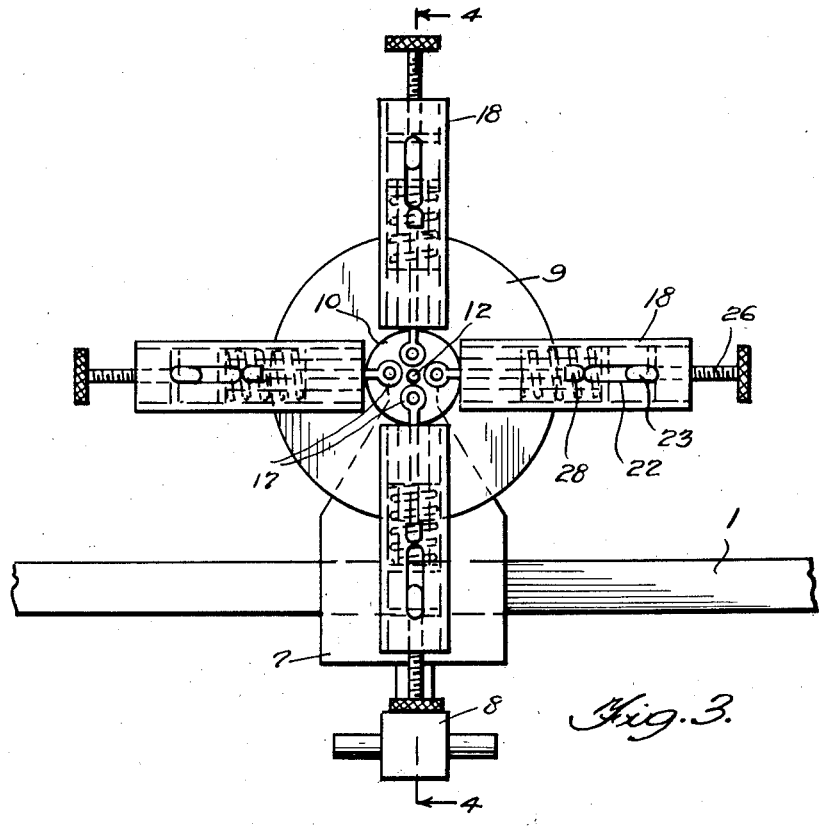
Figure 3 is an enlarged top plan view with parts omitted showing one of the units of the device.

In these views the numeral 1 indicates a supporting bar which has one end extending downwardly as shown at 2 and this end is adapted to be clamped to a side of a table or bench A as shown at 3. A pair of turrets or units B and C is attached to the bar 1, the turret or unit B being carried by an arm 4 which has a sleeve 5 thereon through which the arm or bar 1 passes with the sleeve adjustably held in position on the bar 1 by a set screw 6. A bracket 7 carries the turret or unit C and the bar 1 passes through this bracket 7 and the bracket is held in adjusted position on the bar 1 by the stud bolt 8.

Each turret or unit includes a circular base 9 and a concentric disk 10 rests on the base 9 and an upper disk 11 is located above the disk 10, the two disks being provided with central holes for receiving the post 12 which has its lower end connected with the bracket 4 or 7 and which passes through the center of the disk 9 and the upper end of the post is threaded to receive a nut 13 which acts to compress a concavo-convex disk 14 against parts of the unit as will be hereinafter described. A plurality of pins 15 are carried by the disks 10 and 11, the drawings showing four of these pins and each pin forms a hinge for the inner end of a plate-like member 16 which has an eye 17 through which the pin passes. Each plate-like member 16 has slidingly connected therewith a cylinder 18 which is formed with depending flanges 19 which receive the member 16 between them and these flanges are provided with the longitudinally extending slots 20 for receiving the pin 21 carried by the member 16 so that the cylinder can be moved inwardly and outwardly on the member 16. Each cylinder is provided with an elongate slot 22 in its top for receiving a stud 23 on a piston 24 slidably arranged in the cylinder. The outer end of each cylinder is closed by a plug 25 through which is threaded a shank of a screw 26 which abuts the piston 24 so that by moving the screw inwardly or outwardly the position of the piston 24 can be adjusted so that the stud 23 can be adjusted toward and away from a stationary stud 28 on the top of the cylinder adjacent the inner end of the slot. These parts 28 and 23 form jaws for gripping parts of a spectacle frame or the like for holding the same in position.

The piston is formed with a reduced part 29 which slides in a bushing 30 in the inner end of the cylinder and a spring 31 encircles this part 29 and tends to hold the piston 24 in its outward position or against the inner end of the screw 26.

Figure 4:
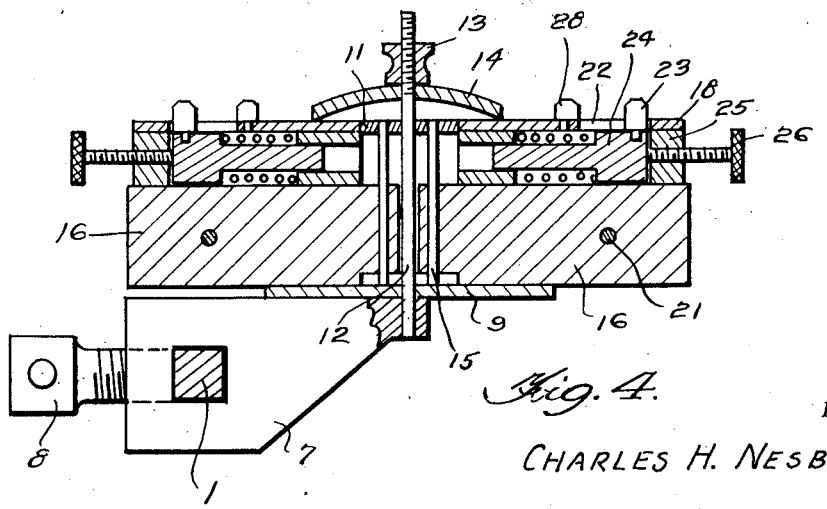
Figure 4 is a section on the line 4—4 of Figure 3.
Figure 5:
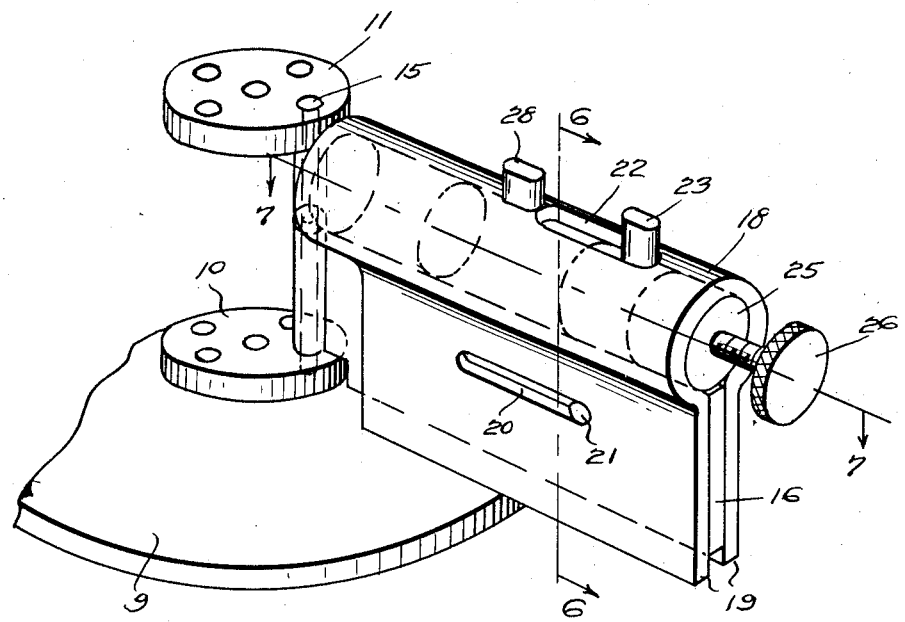
Figure 5 is a perspective view of a portion of one of these units.
Figures 6, 7:
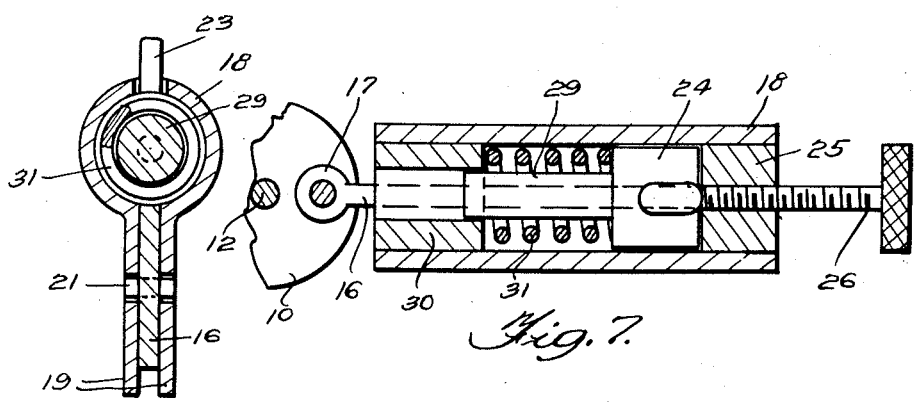
Figure 6 is a section on the line 6—6 of Figure 5.
Figure 7 is a section on the line 7—7 of Figure 5.
Figures 8, 9, 10:
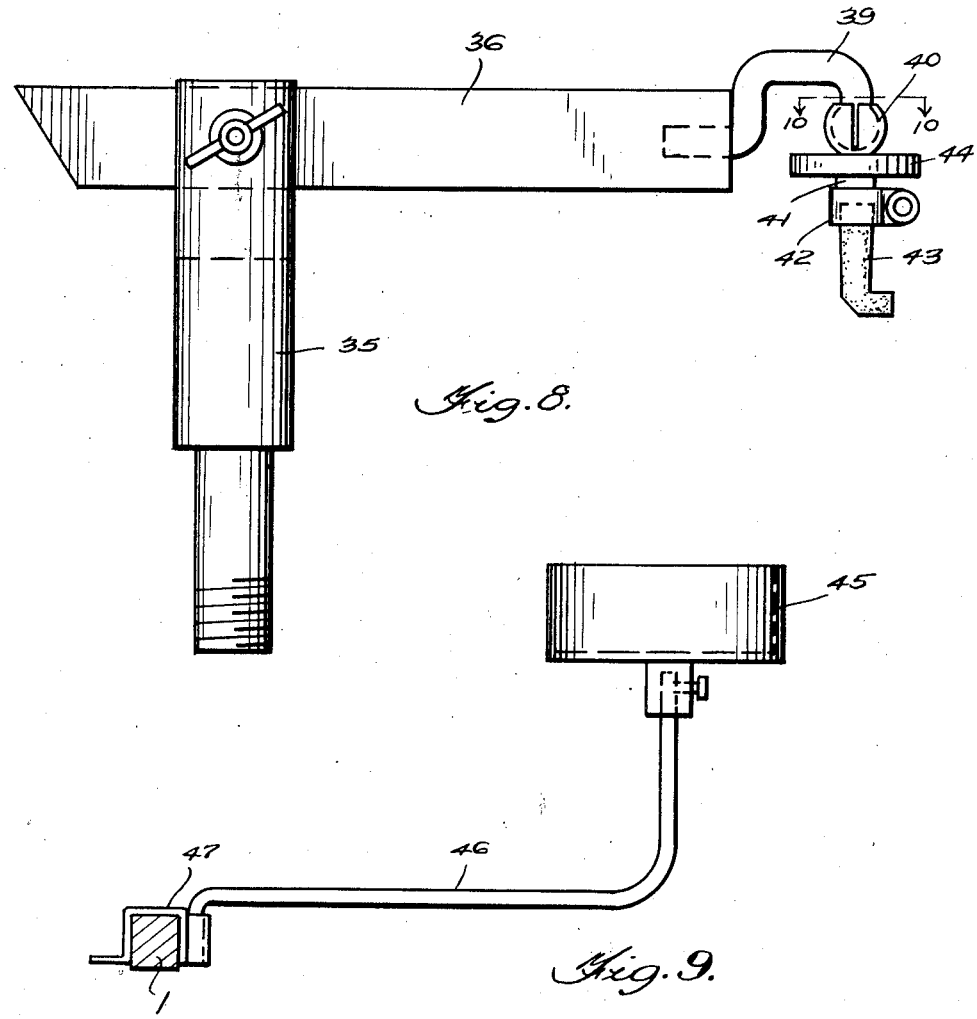
Figure 8 is a view of the carbon holder.
Figure 9 is a view of the tray holder.
Figure 10 is a section on the line 10—10 of Figure 8.

Thus it will be seen that by loosening the nut 13 to remove tension from the member 14, see Figure 4, the cylinders can be adjusted on the plate-like members 16 and also these members 16 can be adjusted on the hinges and after the adjustments have been made the nut 13 is tightened so that the member 14 will exert pressure upon the cylinders and thus hold the parts in adjusted position. Also, by turning the screw 26 of each piston the jaw 23 can be moved toward and away from the jaw 28 to grip parts of the optical frames between the jaws and thus optical frames or parts thereof can be held in different positions so that they can be welded together or otherwise operated upon in making, repairing or changing such frames.

A post 35 has its lower end threaded to be threaded in a hole in the table A and an arm 36 passes through a slot 37 in the upper end of the post, the arm being held in adjusted position in the slot through means of a bolt and wing nut 38. The outer end of the arm carries a substantially U-shaped member 39 which has a universal joint 40 at its free end which connects with a stub shaft 41 having a socket 42 at its lower end for receiving the carbon 43 which is used for welding purposes as will be understood. A tightening ring 44 is placed on the stub shaft 41. A water cup or tray 45 is carried by a bracket 46 which is attached as shown at 47 to the bar 1. This cup is useful when attaching pad carrying parts to other parts, the water in the cup protecting the pads from being burned.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a device of the class described, a turret including a base, a pair of plate-like members pivotally connected with the base at their inner ends, a cylinder slidably arranged on each plate-like member, a stationary jaw on the top of each cylinder, a piston in each cylinder and the top of the cylinder having a slot therein, a movable jaw carried by the piston and passing through the slot for cooperating with the stationary jaw, spring means for moving the piston in one direction and a screw for moving the piston in an opposite direction.

2. In a device of the class described, a turret including a base, a pair of plate-like members pivotally connected with the base at their inner ends, a cylinder slidably arranged on each plate-like member, a stationary jaw on the top of each cylinder, a piston in each cylinder and the top of the cylinder having a slot therein, a movable jaw carried by the piston and passing through the slot for cooperating with the stationary jaw, spring means for moving the piston in one direction and a screw for moving the piston in an opposite direction, and tension means for holding the piston in adjusted position on the plate-like members and said members in adjusted position on their pivots.

3. In a device of the class described, a horizontally extending bar, a pair of turrets each including a base member, means for slidably engaging the base members to the bar, means for holding the base members in adjusted position on the bar, upper and lower disks supported from each base member, hinge pins vertically arranged and carried by disks, plate-like members hinged to the pins at the inner ends, cylinders slidably arranged on the plate-like members, a rod passing through each base member and through the disk, a tension device on the upper end of the rod for engaging the upper portions of the cylinders, a nut on the upper end of the rod for applying tension to the tension member, a stationary jaw on each cylinder and each cylinder having a slot leading to a point adjacent the stationary jaw, a piston in each cylinder, a movable jaw carried thereby and passing through the slot, spring means for holding the pistons with the jaws thereof away from the stationary jaws and screw means for moving the piston to place the jaws thereon adjacent the other jaws.

CHARLES H. NESBIT.